(12) United States Patent
Tawa

(10) Patent No.: US 10,316,799 B2
(45) Date of Patent: Jun. 11, 2019

(54) ELECTROMAGNETIC VALVE AND VAPORIZED GAS TREATMENT SYSTEM

(71) Applicant: MITSUBISHI ELECTRIC CORPORATION, Tokyo (JP)

(72) Inventor: Yutaro Tawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 14 days.

(21) Appl. No.: 15/541,674

(22) PCT Filed: Feb. 5, 2015

(86) PCT No.: PCT/JP2015/053248
§ 371 (c)(1),
(2) Date: Jul. 5, 2017

(87) PCT Pub. No.: WO2016/125288
PCT Pub. Date: Aug. 11, 2016

(65) Prior Publication Data
US 2018/0274493 A1  Sep. 27, 2018

(51) Int. Cl.
*F02M 25/08* (2006.01)
*F02M 35/02* (2006.01)
*F02M 35/10* (2006.01)

(52) U.S. Cl.
CPC ...... *F02M 25/0836* (2013.01); *F02M 25/089* (2013.01); *F02M 35/02* (2013.01);
(Continued)

(58) Field of Classification Search
CPC .. F02M 25/089; F02M 25/0836; F02M 35/02; F02M 35/10222; F02M 2025/0845
See application file for complete search history.

(56) References Cited

U.S. PATENT DOCUMENTS 4,127,097 A * 11/1978 Takimoto ........... F02M 25/0836
123/520
5,447,141 A * 9/1995 Kitamoto ........... F02M 25/0809
123/198 D
(Continued)

FOREIGN PATENT DOCUMENTS

CN 103670816 A 3/2014
DE 42 25 993 C1 1/1994
(Continued)

OTHER PUBLICATIONS

Office Action issued in corresponding Chinese Application No. 201580074897.5 dated Nov. 30, 2018.

*Primary Examiner* — Hieu T Vo
*Assistant Examiner* — Arnold Castro
(74) *Attorney, Agent, or Firm* — Birch, Stewart, Kolasch & Birch, LLP

(57) ABSTRACT

A first electromagnetic valve includes a suction port that communicates with a purge pipe and sucks vaporized gas from a canister, a discharge port that communicates with a first purge pipe and discharges the vaporized gas to a downstream side of a throttle, a branch port that communicates with second purge pipes to which a second electromagnetic valve is attached and causes the vaporized gas to branch off to an upstream side of a compressor, a branch passage that diverges into and communicates with the suction port, the discharge port and the branch port. The branch passage includes a chamber having an inner diameter larger than each inner diameter of the ports.

9 Claims, 7 Drawing Sheets

(52) U.S. Cl.
CPC ... *F02M 35/10157* (2013.01); *F02M 35/10222* (2013.01); *F02M 2025/0845* (2013.01); *Y02T 10/144* (2013.01)

(56) References Cited

U.S. PATENT DOCUMENTS

| | | | |
|---|---|---|---|
| 6,283,088 B1 * | 9/2001 | Takagi | F02B 17/005 123/295 |
| 2002/0046609 A1 * | 4/2002 | Ito | F02M 25/0809 73/700 |
| 2002/0139173 A1 * | 10/2002 | Kano | F02M 25/0809 73/49.7 |
| 2004/0025851 A1 | 2/2004 | Krimmer et al. | |
| 2004/0237946 A1 * | 12/2004 | Murakami | F02M 25/08 123/520 |
| 2009/0078238 A1 | 3/2009 | Ueda et al. | |
| 2011/0000563 A1 | 1/2011 | Ito et al. | |
| 2013/0042839 A1 | 2/2013 | Takahashi et al. | |
| 2013/0199504 A1 * | 8/2013 | Takeishi | F02M 25/0809 123/520 |
| 2016/0298578 A1 * | 10/2016 | Makino | F02M 35/10222 |

FOREIGN PATENT DOCUMENTS

| | | |
|---|---|---|
| JP | 2006-104986 A | 4/2006 |
| JP | 4611384 B2 | 1/2011 |
| JP | 5436679 B2 | 3/2014 |
| WO | WO 2008/090657 A1 | 7/2008 |

\* cited by examiner

ELECTROMAGNETIC VALVE AND VAPORIZED GAS TREATMENT SYSTEM

TECHNICAL FIELD

The invention relates to an electromagnetic valve for use in a vaporized gas treatment system for a turbocharged engine mounted on a vehicle, such as an automobile.

BACKGROUND ART

In conventional vaporized gas treatment systems, vaporized gas in a canister is sucked into the engine by using a negative pressure generated in the intake manifold on the downstream side of the throttle. In turbocharged engines, because a positive pressure generated during turbocharging on the downstream side of the throttle makes it difficult to suck the vaporized gas toward the downstream side of the throttle from the canister, the vaporized gas in the canister is sucked into the compressor by using the negative pressure generated on the upstream side of the compressor, and is then fed to the engine (see, e.g., Patent Literature 1).

CITATION LIST

Patent Literature

Patent Literature 1: Japanese Patent Application Laid-open No. 2006-104986

SUMMARY OF INVENTION

Technical Problem

In the conventional vaporized gas treatment systems, such as described in FIG. 1 in Patent Literature 1, a pipe is separated into two branches to provide a path for sucking the vaporized gas to the downstream side of the throttle from the canister, and a path for sucking the vaporized gas to the upstream side of the compressor from the canister. There is a problem with this configuration that assembly workability is reduced due to complication of the piping, and that the flow rate of the vaporized gas is reduced due to a pressure loss at a branch portion. During travel, the generated negative pressure in the intake manifold is small and the number of opportunities for the vaporized gas treatment is reduced, and hence an increase in the flow rate of the vaporized gas treatment is desired.

In addition, in the case where the path is switched between the path for sucking the vaporized gas to the downstream side of the throttle from the canister and the path for sucking the vaporized gas to the upstream side of the compressor from the canister by using, e.g., a three-way valve described in FIG. 10 in Patent Literature 1, even when the assembly workability is improved by omitting a branch pipe or the like, it is not possible to solve the problem that the flow rate of the vaporized gas is reduced due to the pressure loss at the three-way valve.

The invention has been made in order to solve the problems above, and an object thereof is to improve the assembly workability, reduce the pressure loss of the vaporized gas, and increase the flow rate in the vaporized gas treatment system of the turbocharged engine.

Solution to Problem

An electromagnetic valve according to the invention is for use in a vaporized gas treatment system which includes a canister for storing vaporized gas, a purge pipe connected to the canister, a first purge pipe interconnecting the purge pipe and a downstream side of a throttle of an intake pipe, a second purge pipe interconnecting the purge pipe and an upstream side of a compressor of the intake pipe, and an engine to suck the vaporized gas stored in the canister into the intake pipe from the purge pipe via the first purge pipe or the second purge pipe for combustion. The electromagnetic valve includes: three ports to communicate with the purge pipe, the first purge pipe and the second purge pipe, a branch passage that diverges into and communicates with the three ports, and a valve body to open or close the branch passage. The branch passage includes a portion being a chamber that is larger than each inner diameter of the three ports. The valve body opens or closes a passage from the canister to the downstream side of the throttle in the branch passage, and another electromagnetic valve is to be disposed in a passage from the canister to the upstream side of the compressor.

Advantageous Effects of Invention

According to the invention, because the electromagnetic valve used in the vaporized gas treatment system includes the branch passage that diverges from the purge pipe connected to the canister into the first purge pipe that communicates with the downstream side of the throttle and the second purge pipe that communicates with the upstream side of the compressor, it is possible to eliminate the need for the branch pipe or the like that has been needed conventionally, and improve the assembly workability. In addition, because the branch passage includes a portion being a chamber that is larger than inner diameters of the ports, it is possible to reduce the pressure loss of the vaporized gas and increase the flow rate.

DESCRIPTION OF EMBODIMENTS

Hereinbelow, in order to describe the invention in greater detail, embodiments will be described according to the accompanying drawings.

Embodiment 1

Figure 1:
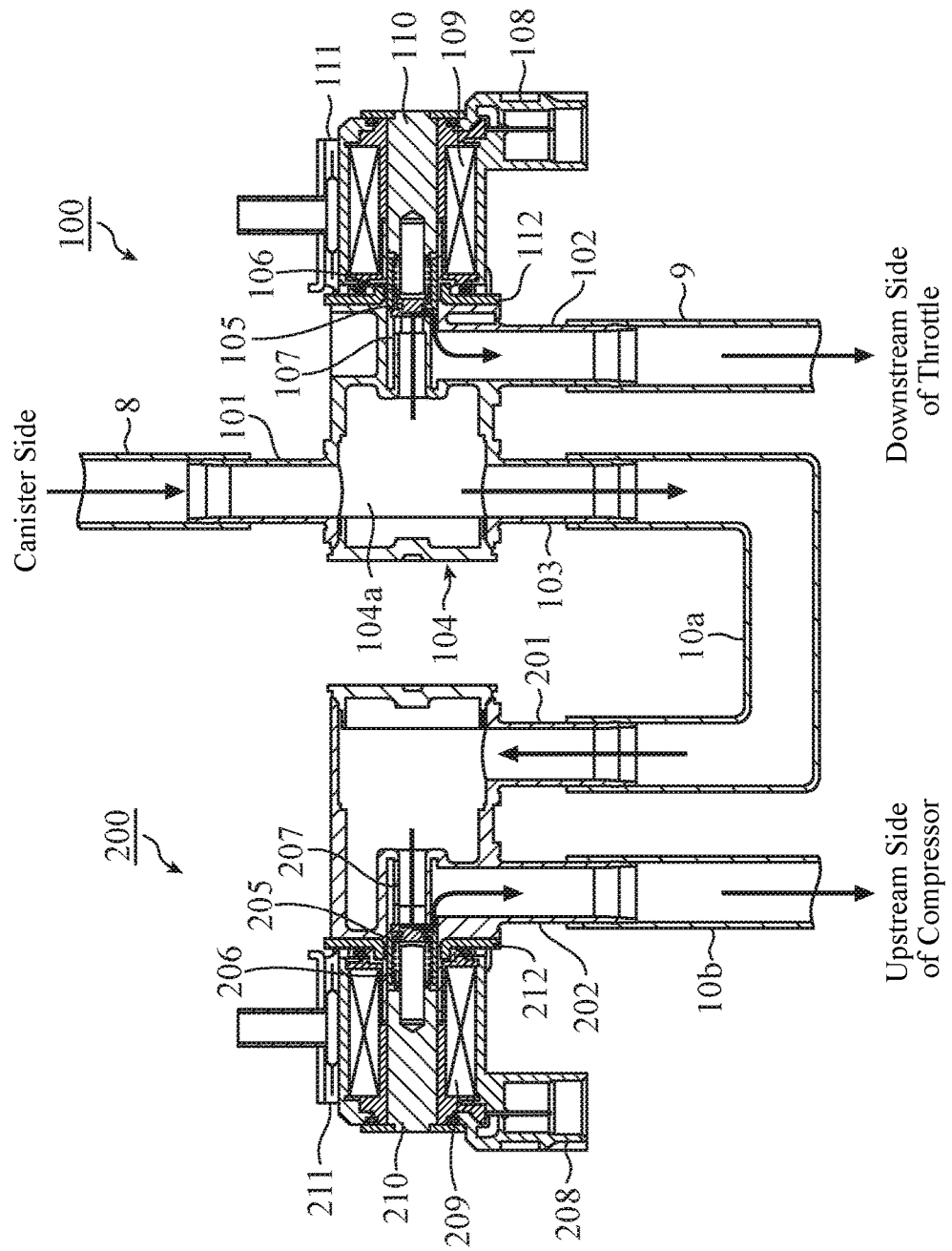
FIG. 1 is a cross-sectional view showing an example of the configuration of an electromagnetic valve used in a vaporized gas treatment system according to Embodiment 1 of the invention.

FIG. 1 is a cross-sectional view showing an example of a configuration of an electromagnetic valve used in a vaporized gas treatment system according to Embodiment 1 of the invention. A first electromagnetic valve 100 and a second electromagnetic valve 200 shown in FIG. 1 are in a closed state.

The first electromagnetic valve 100 includes a suction port 101, a discharge port 102, a branch port 103, a branch passage 104 that diverges from the suction port 101 into the discharge port 102 and branch port 103 and interconnects these ports, and a chamber 104a which is a portion of the branch passage 104 and is larger than the inner diameter of each port. The suction port 101 is connected to a purge pipe 8, and communicates with a canister of the vaporized gas treatment system described later. The discharge port 102 is connected to a first purge pipe 9, and communicates with an intake manifold on the downstream side of a throttle. The branch port 103 is connected to a second purge pipe 10a, and communicates with a suction port 201 of a second electromagnetic valve 200.

A plunger 105 receives a biasing force of a spring 106 to abut on a valve seat 107, thereby blocking the communication between the suction port 101 and the discharge port 102. In a portion of the plunger 105 that abuts on the valve seat 107 a valve is formed of an elastic member, such as rubber, and the plunger 105 functions as a valve body. In the case where it is assumed that the side of the suction port 101 of the branch passage 104 is a suction side, and the side of the discharge port 102 thereof is a discharge side, the branch passage 104 branches on the suction side of the plunger 105 that serves as the valve body.

In a state in which a voltage is not applied to a connector terminal 108, the plunger 105 receives the biasing force of the spring 106 and abuts on the valve seat 107 to thereby block the communication between the suction port 101 and the discharge port 102. When a voltage is applied to the connector terminal 108, a current flows through a coil 109, magnetic fields are generated in a core 110, a yoke 111 and a plate 112, which are a magnetic material, and an electromagnetic force is produced. When an electromagnetic force that is larger than a valve closing force caused by the biasing force of the spring 106 acts as a valve opening force, the plunger 105 is attracted to the core 110, and the suction port 101 communicates with the discharge port 102.

The second electromagnetic valve 200 includes the suction port 201 and a discharge port 202. The suction port 201 is connected to the second purge pipe 10a, and communicates with the branch port 103 of the first electromagnetic valve 100. The discharge port 202 is connected to a second purge pipe 10b, and communicates with the upstream side of a compressor of the vaporized gas treatment system.

A plunger 205 receives the biasing force of a spring 206 to abut on a valve seat 207, thereby blocking the communication between the suction port 201 and the discharge port 202. Similarly to the first electromagnetic valve 100, in the second electromagnetic valve 200 as well, when a voltage is applied to a connector terminal 208, a current flows to a coil 209, magnetic fields are generated in a core 210, a yoke 211 and a plate 212, which are a magnetic material, and an electromagnetic force is produced. The electromagnetic force that is larger than the valve closing force caused by the biasing force of the spring 206 acts as the valve opening force, whereby the plunger 205 is attracted to the core 210, and the suction port 201 and the discharge port 202 communicate with each other.

Energization control of the first electromagnetic valve 100 and the second electromagnetic valve 200 is performed by, e.g., an engine control unit (ECU). The ECU controls the energization to the first electromagnetic valve 100 and the second electromagnetic valve 200, whereby the opening and closing of the first electromagnetic valve 100 and the second electromagnetic valve 200 are controlled and the flow rate of the vaporized gas is controlled.

The plunger 105 of the first electromagnetic valve 100 opens or closes the passage from the canister to the downstream side of a throttle valve in the branch passage 104. In the passage from the canister to the upstream side of the compressor in the branch passage 104, the second electromagnetic valve 200 different from the first electromagnetic valve 100 is disposed, and the plunger 205 of the second electromagnetic valve 200 opens or closes this passage to the upstream side.

Figure 2:
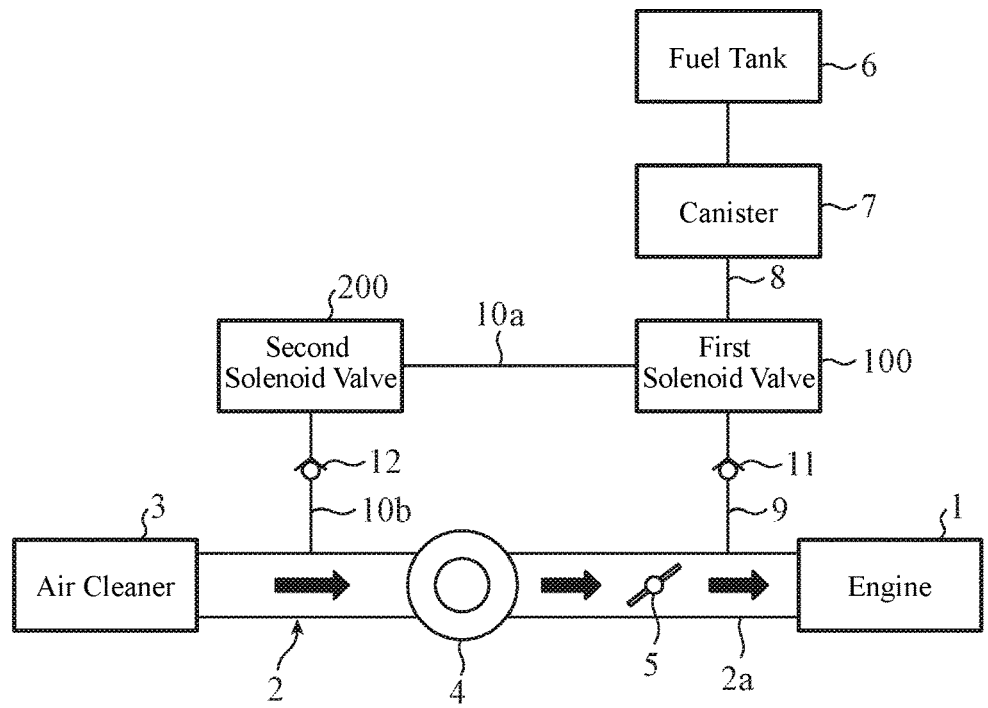
FIG. 2 is an overall configuration diagram of the vaporized gas treatment system according to Embodiment 1.

FIG. 2 is an overall configuration diagram of the vaporized gas treatment system for a turbocharged engine. The turbocharged engine includes components, such as an engine 1, a turbocharger, which is not shown, and an intake pipe 2. The intake pipe 2 is connected to the engine 1. The air that is taken in on the upstream side of the intake pipe 2 passes through an air cleaner 3, is compressed by a compressor 4 of the turbocharger, and is introduced into the engine 1 from an intake manifold 2a through a throttle valve 5.

Volatility of gasoline is extremely high and the inner pressure of a sealed fuel tank 6 is high, and hence only a vaporized gas component is temporarily stored in a device filled with active carbon called a canister 7, and air from which the vaporized gas component is removed is released to the atmosphere from an air release opening that is not shown. The vaporized gas component stored in the canister 7 is introduced into the engine 1 and is combusted. The upstream side of the purge pipe 8 is connected to the canister 7. The first electromagnetic valve 100 is disposed on the downstream side of the purge pipe 8. The first electromagnetic valve 100 separates the purge pipe 8 into two branches, one of which is the first purge pipe 9, and the other of which is the second purge pipe 10a. The first purge pipe 9 communicates with the intake manifold 2a on the downstream side of the throttle valve 5 of the intake pipe 2, while the second purge pipes 10a and 10b communicate with the intake pipe 2 on the upstream side of the compressor 4. A first check valve 11 and a second check valve 12 that are for fail-safe are respectively disposed in the first purge pipe 9 and the second purge pipe 10b. Each of the first check valve 11 and the second check valve 12 closes when positive pressure is generated in the intake pipe 2 to prevent backflow of the vaporized gas.

During a time period in which the engine 1 is not turbocharged and the compressor 4 does not operate, negative pressure is generated in the intake manifold 2a on the downstream side of the throttle. At this point, the first electromagnetic valve 100 opens and the second electromagnetic valve 200 closes. As a result, the vaporized gas stored in the canister 7 is sucked into the intake manifold 2a with the negative pressure of the intake manifold 2a via the purge pipe 8, the suction port 101 and the discharge port 102 of the first electromagnetic valve 100, and the first purge pipe 9. The sucked vaporized gas mixes with air in the intake manifold 2a, and flows into the engine 1 to be combusted. The ECU, which is not shown, controls the flow rate of the vaporized gas that flows from the canister 7 into the engine 1 during the time period in which the engine 1 is not turbocharged by controlling the opening or closing of the first electromagnetic valve 100.

During a time period in which the engine 1 is turbocharged and the compressor 4 operates, the intake manifold 2a has the positive pressure, and hence it is difficult to perform the suction of the vaporized gas that uses the above negative pressure. To cope with this, by using the negative pressure generated on the upstream side of the compressor 4, the vaporized gas of the canister 7 is sucked into the engine 1. At this point, the first electromagnetic valve 100 closes and the second electromagnetic valve 200 opens. As a result, the vaporized gas stored in the canister 7 is sucked into the intake pipe 2 with the negative pressure generated on the upstream side of the compressor 4 via the purge pipe 8, the suction port 101, the chamber 104a and the branch port 103 of the first electromagnetic valve 100, the second purge pipe 10a, the suction port 201 and the discharge port 202 of the second electromagnetic valve 200, and the second purge pipe 10b. The sucked vaporized gas mixes with air in the intake pipe 2, and flows into the engine 1 through the compressor 4 and the throttle valve 5 to be combusted. The ECU, which is not shown, controls the flow rate of the vaporized gas that flows from the canister 7 into the engine 1 during the time period in which the engine 1 is turbocharged by controlling the opening or closing of the second electromagnetic valve 200.

Thus, in Embodiment 1, the chamber 104a is formed within the branch passage 104, which diverges into the path that sucks the vaporized gas into the intake manifold 2a from the canister 7 and the path that sucks the vaporized gas to the upstream side of the compressor 4 from the canister 7. Because the inner diameter of the chamber 104a is larger than each inner diameter of the suction port 101, the discharge port 102 and the branch port 103, the chamber 104a functions as a buffer tank of the vaporized gas to stabilize the flow of the vaporized gas. Therefore, it is possible to reduce a pressure loss in the branch passage 104 and increase the flow rate of the vaporized gas.

In contrast, in the conventional technique, a trifurcated branch pipe or a three-way valve is used at a portion where the path that sucks the vaporized gas into the intake manifold 2a from the canister 7 and the path that sucks the vaporized gas to the upstream side of the compressor 4 from the canister 7 diverge. Because the conventional branch pipe or three-way valve does not have the chamber 104a, the vaporized gas collides with the diverging portion. By this, the flow of the vaporized gas is disturbed, the pressure loss occurs, and the flow rate of the vaporized gas is reduced. In addition, in the case where the branch pipe is used, it is necessary to use a hose and a clip to connect the branch pipe and other components, such as the canister, and an electromagnetic valve or the like that controls the flow rate of the vaporized gas after diverging, and hence assembly workability is deteriorated and the cost is increased due to an increase in the number of components.

Next, a reverse suction mode of the first electromagnetic valve 100 and the second electromagnetic valve 200 will be described.

The first electromagnetic valve 100 and the second electromagnetic valve 200 shown in FIG. 1 are in the reverse suction mode.

In the invention, a configuration in which a differential pressure before and behind the plunger 105, i.e., a differential pressure between the side of the suction port 101 and the side of the discharge port 102 acts so as to open the plunger 105 when the vaporized gas is sucked into the engine 1 from the canister 7 is referred to as the reverse suction mode of the first electromagnetic valve 100.

Figure 3:
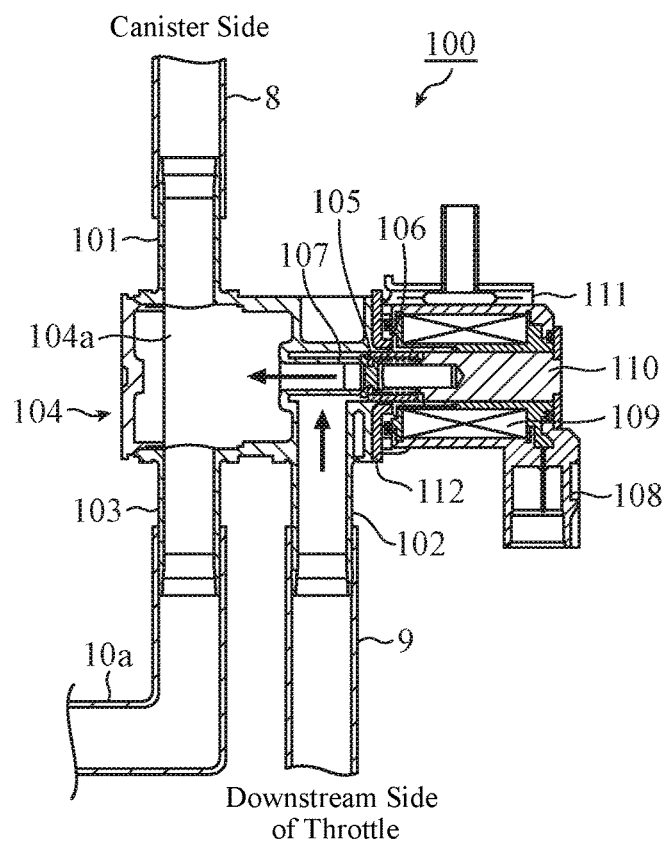
FIG. 3 is a view for explaining a state in which a positive pressure is applied to a first electromagnetic valve from the downstream side of a throttle in Embodiment 1.

According to the reverse suction mode, when the pressure in the intake manifold 2a is positive during turbocharging, a differential pressure before and behind the plunger 105 acts so as to close the plunger 105, as shown in FIG. 3. Accordingly, the reverse suction mode allows the first electromagnetic valve 100 to serve as the first check valve 11, eliminating the need for the first check valve 11.

The second electromagnetic valve 200 is also in the reverse suction mode in FIG. 1, and hence, when the vaporized gas is sucked into the engine 1 from the canister 7, a differential pressure before and behind the plunger 205, i.e., a differential pressure between the side of the suction port 201 and the side of the discharge port 202 acts so as to open the plunger 205. When a positive pressure is generated in the intake pipe 2, a differential pressure due to this acts so as to close the plunger 205. Therefore, it is possible for the second electromagnetic valve 200 to serve as the second check valve 12, and the need for the second check valve 12 can be eliminated.

Figure 4:
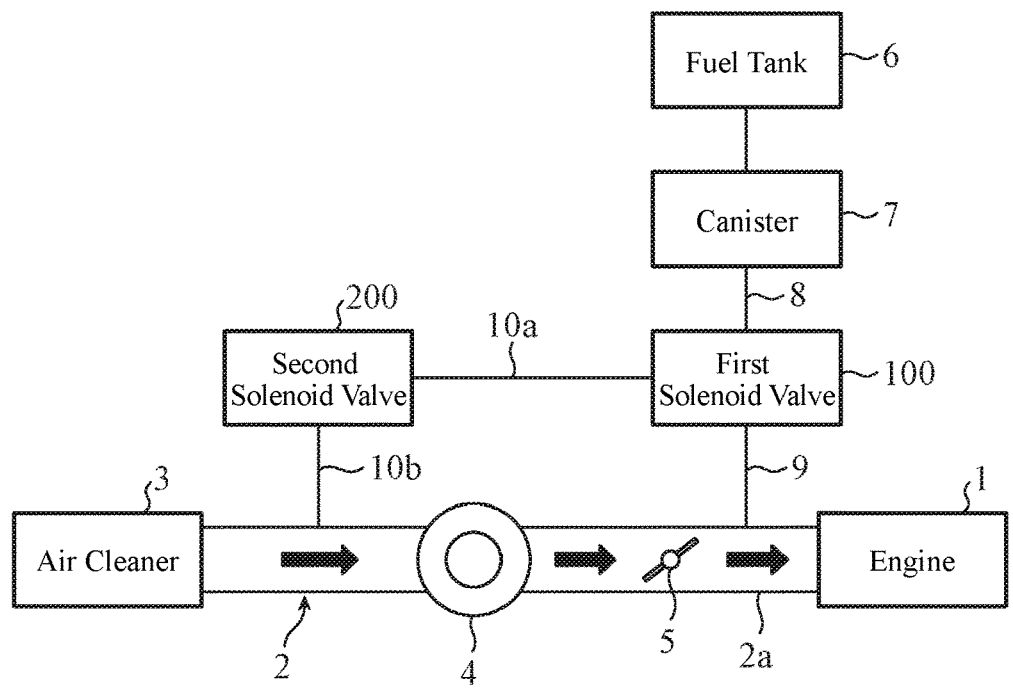
FIG. 4 is an overall configuration diagram of the vaporized gas treatment system in the case where the first electromagnetic valve and a second electromagnetic valve each in a reverse suction mode are used in Embodiment 1.

FIG. 4 shows a configuration diagram of the vaporized gas treatment system for the turbocharged engine in which the first electromagnetic valve 100 in the reverse suction mode and the second electromagnetic valve 200 in the reverse suction mode are used. By adopting a configuration in which the first check valve 11 and the second check valve 21 are not provided, it is possible to omit the hose, the clip and the like for connecting the first check valve 11 to the first purge pipe 9, and it is also possible to omit the hose, the clip and the like for connecting the second check valve 12 to the second purge pipe 10b. In addition, the pressure loss that occurs in the first check valve 11 and the second check valve 12 is eliminated, and hence the flow rate of the vaporized gas is increased.

It is also possible to set both modes of the first electromagnetic valve 100 and the second electromagnetic valve 200 to a positive suction mode. In the case where the first electromagnetic valve 100 and the second electromagnetic valve 200 in the positive suction mode are used, as shown in FIG. 2, the vaporized gas treatment system needs the first check valve 11 and the second check valve 12.

Figure 5:
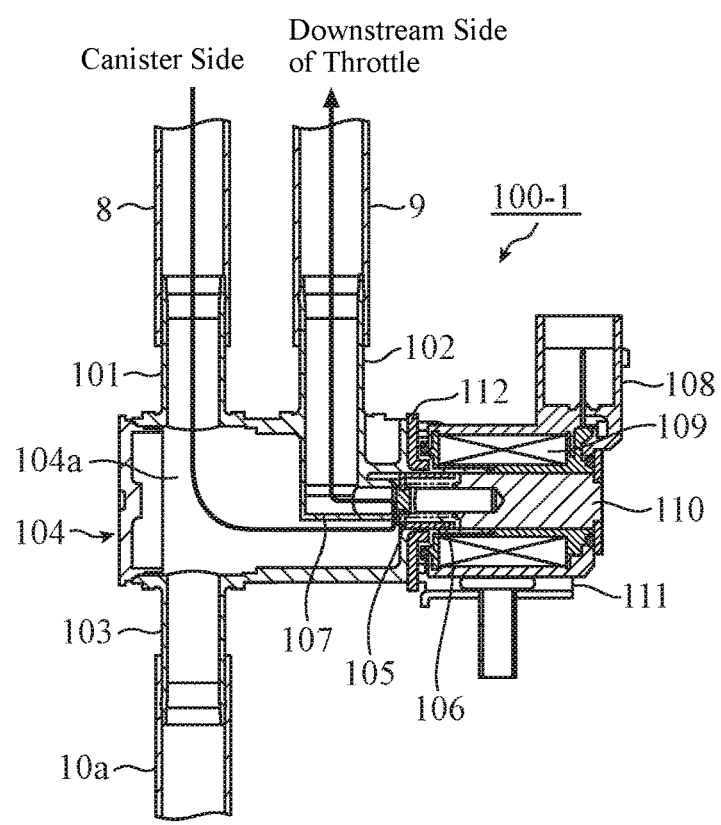
FIG. 5 is a cross-sectional view in the case where the first electromagnetic valve is configured so as to have a positive suction mode in Embodiment 1.

Herein, FIG. 5 shows a cross-sectional view of a first electromagnetic valve 100-1 in the positive suction mode. In the first electromagnetic valve 100-1 in the positive suction mode, when the vaporized gas is sucked into the engine 1 from the canister 7, a differential pressure before and behind the plunger 105 acts so as to close the plunger 105. When the pressure in the intake manifold 2a is positive, a differential pressure due to this acts so as to open the plunger 105, and hence the first check valve 11 that prevents the backflow of the vaporized gas is essential.

Although the depiction is omitted, in the case where the mode of the second electromagnetic valve 200 is also set to the positive suction mode similarly to the above case, when the vaporized gas is sucked into the engine 1 from the canister 7, a differential pressure before and behind the plunger 205 acts so as to close the plunger 205. In the case where a positive pressure is generated in the intake pipe 2, a differential pressure due to this acts so as to open the plunger 205, and hence the second check valve 12 that prevents the backflow of the vaporized gas is essential.

As described above, according to Embodiment 1, the first electromagnetic valve 100 includes the suction port 101 that communicates with the purge pipe 8 and sucks the vaporized gas from the canister 7, the discharge port 102 that communicates with the first purge pipe 9 and discharges the vaporized gas to the downstream side of the throttle, the branch port 103 that communicates with the second purge pipes 10a and 10b to which the second electromagnetic valve 200 is attached and causes the vaporized gas to branch off to the upstream side of the compressor, the branch passage 104 that diverges from the suction port 101 into the discharge port 102 and branch port 103 and interconnects these ports, the plunger 105 that opens or closes the passage that interconnects the suction port 101 and the discharge port 102 in the branch passage 104, and the chamber 104a which is a portion of the branch passage 104 and is larger than the inner diameters of the suction port 101, the discharge port 102 and the branch port 103. Accordingly, it is possible to eliminate the need for the branch pipe or the like that has been needed conventionally, improve the assembly workability, reduce the pressure loss of the vaporized gas, and increase the flow rate.

In addition, according to Embodiment 1, by setting the mode of the first electromagnetic valve 100 to the reverse suction mode in which a differential pressure before and behind the plunger 105 acts so as to open the plunger 105 when the vaporized gas is sucked into the engine 1 from the canister 7, it is possible to eliminate the need for the first check valve 11, and omit the hose, the clip and the like used for the connection of the first check valve 11. In addition, there is no pressure loss in the first check valve 11, and hence it becomes possible to further increase the flow rate of the vaporized gas.

Embodiment 2

Figure 6:
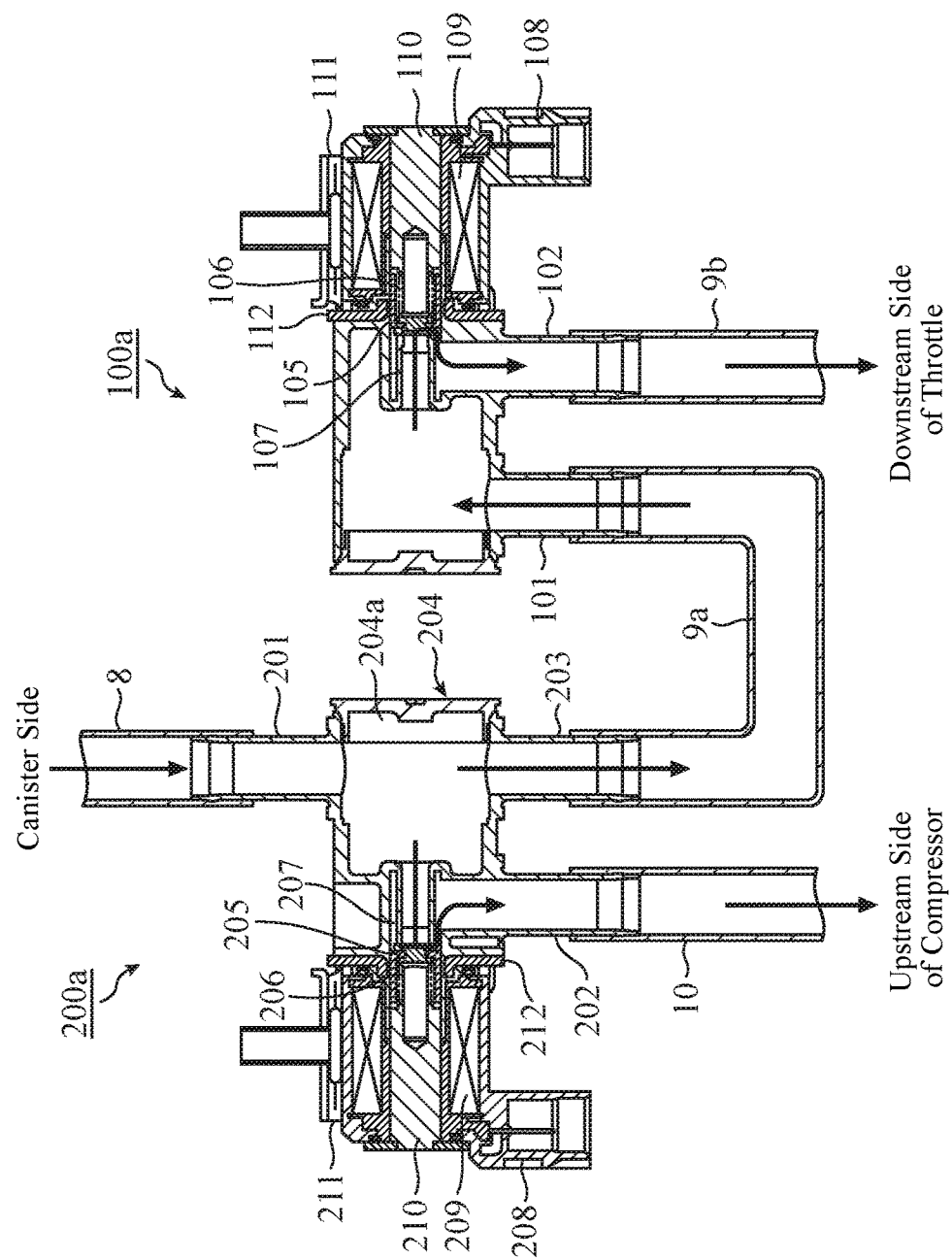
FIG. 6 is a cross-sectional view showing an example of the configuration of the electromagnetic valve used in the vaporized gas treatment system according to Embodiment 2 of the invention.
Figure 7:
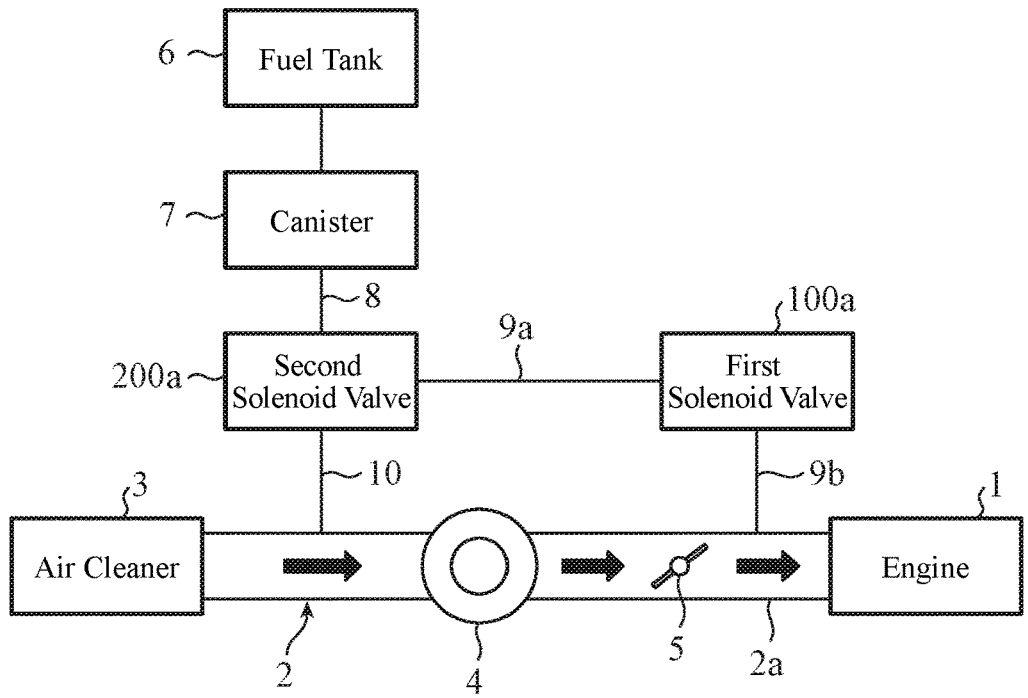
FIG. 7 is an overall configuration diagram of the vaporized gas treatment system according to Embodiment 2.

FIG. 6 is a cross-sectional view showing an example of the configuration of the electromagnetic valve used in the vaporized gas treatment system according to Embodiment 2 of the invention. FIG. 7 is an overall configuration diagram of the vaporized gas treatment system according to Embodiment 2. A first electromagnetic valve 100a and a second electromagnetic valve 200a shown in FIG. 6 are in the closed state. Note that portions in FIG. 6 and FIG. 7 that are identical or equivalent to those in FIGS. 1 to 4 are designated by the same reference numerals, and the description thereof will be omitted.

In Embodiment 1 described above, as shown in FIG. 2, the path from the canister 7 to the downstream side of the throttle valve 5 and the path from the canister 7 to the upstream side of the compressor 4 are separated using the first electromagnetic valve 100. In contrast, according to Embodiment 2, as shown in FIG. 7, the path from the canister 7 to the upstream side of the compressor 4 and the path from the canister 7 to the downstream side of the throttle valve 5 are separated using the second electromagnetic valve 200a. In addition, the plunger 205 of the second electromagnetic valve 200a opens or closes the passage from the canister 7 to the upstream side of the compressor 4 in a branch passage 204. The first electromagnetic valve 100a different from the second electromagnetic valve 200a is disposed in the passage from the canister 7 to the downstream side of the throttle valve 5 in the branch passage 204, and the plunger 105 of the first electromagnetic valve 100a opens or closes this passage.

The second electromagnetic valve 200a includes the suction port 201, the discharge port 202, a branch port 203, a branch passage 204 that diverges from the suction port 201 into the discharge port 202 and the branch port 203 and interconnects these ports, and a chamber 204a which is a portion of the branch passage 204 that has an inner diameter larger than the inner diameter of each port. The suction port 201 is connected to the purge pipe 8, and communicates with the canister 7. The discharge port 202 is connected to a second purge pipe 10, and communicates with the upstream side of the compressor 4. The branch port 203 is connected to a first purge pipe 9a, and communicates with the suction port 101 of the first electromagnetic valve 100a. In the case where it is assumed that the side of the suction port 201 of the branch passage 204 is the suction side, and the discharge port 202 thereof is the discharge side, the branch passage 204 branches on the suction side of the plunger 205 serving as the valve body. When the plunger 205 abuts on the valve seat 207, the communication between the suction port 201 and the discharge port 202 is blocked, and hence the vaporized gas does not flow. When the plunger 205 is separated from the valve seat 207, the suction port 201 and the discharge port 202 communicate with each other, and the vaporized gas flows to the upstream side of the compressor 4.

The first electromagnetic valve 100a includes the suction port 101 and the discharge port 102. The suction port 101 is connected to the first purge pipe 9a, and communicates with the branch port 203 of the second electromagnetic valve 200a. The discharge port 102 is connected to a first purge pipe 9b, and communicates with the intake manifold 2a on the downstream side of the throttle valve 5. When the plunger 105 abuts on the valve seat 107, the communication between the suction port 101 and the discharge port 102 is blocked, and hence the vaporized gas does not flow. When the plunger 105 is separated from the valve seat 107, the suction port 101 and the discharge port 102 communicate with each other, and the vaporized gas flows to the intake manifold 2a.

The second electromagnetic valve 200a shown in FIG. 6 is in the reverse suction mode, and hence the second electromagnetic valve 200a can serve as the check valve. Accordingly, it is not necessary to dispose a check valve in the second purge pipe 10. In the case where the second electromagnetic valve 200a in the positive suction mode is used, it is necessary to dispose a check valve in the second purge pipe 10.

Similarly, the first electromagnetic valve 100a shown in FIG. 6 is also in the reverse suction mode, and hence the first electromagnetic valve 100a can serve as the check valve. Accordingly, it is not necessary to dispose a check valve in the first purge pipe 9b. In the case where the first electromagnetic valve 100a in the positive suction mode is used, it is necessary to dispose a check valve in the first purge pipe 9b.

The vaporized gas treatment system according to Embodiment 2 allows commonality of the first electromagnetic valve 100a and its peripheral layout in the turbocharged engine and the naturally aspirated engine.

Figure 8:
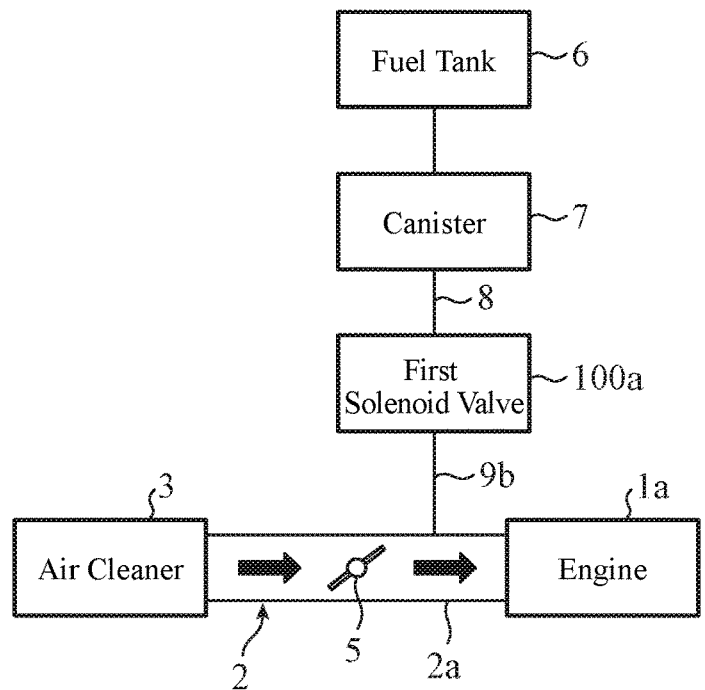
FIG. 8 is an overall configuration diagram in the case where the vaporized gas treatment system in FIG. 7 is adapted to a naturally aspirated engine.

Herein, FIG. 8 shows an overall configuration diagram in the case where part of the vaporized gas treatment system of the turbocharged engine shown in FIG. 7 is adapted to the naturally aspirated engine. In the vaporized gas treatment system of the naturally aspirated engine, the vaporized gas stored in the canister 7 is sucked into the intake manifold 2a with the negative pressure generated in the intake manifold 2a via the purge pipe 8 and the first purge pipe 9b, is mixed with air, and is caused to flow into an engine 1a to be combusted. In the first electromagnetic valve 100a, the suction port 101 is connected to the purge pipe 8, the discharge port 102 is connected to the first purge pipe 9b. The first electromagnetic valve 100a controls the flow rate of the vaporized gas flowing from the canister 7 to the engine 1a. Note that, in the vaporized gas treatment system of the naturally aspirated engine, the first electromagnetic valve 100a and its peripheral piping shown in FIG. 7 are not necessary.

As described above, according to Embodiment 2, the second electromagnetic valve 200a includes the suction port 201 that communicates with the purge pipe 8 and sucks the vaporized gas from the canister 7, the discharge port 202 that communicates with the second purge pipe 10 and discharges the vaporized gas to the upstream side of the compressor, the branch port 203 that communicates with the first purge pipes 9a and 9b to which the first electromagnetic valve 100a is attached and causes the vaporized gas to branch off to the downstream side of the throttle, the branch passage 204 that diverges from the suction port 201 into the discharge port 202 and the branch port 203 and interconnects these ports, the plunger 205 that opens or closes the passage that interconnects the suction port 201 and the discharge port 202 in the branch passage 204, and the chamber 204a which is a portion of the branch passage 204 that has an inner diameter larger than the inner diameters of the suction port 201, the discharge port 202 and the branch port 203. Accordingly, it is possible to eliminate the need for the branch pipe or the like that has been needed conventionally, improve the assembly workability, reduce the pressure loss of the vaporized gas, and increase the flow rate. Further, the vaporized gas treatment system allows the commonality of the second electromagnetic valve 200a and the peripheral layout of the second electromagnetic valve 200a in the turbocharged engine and the naturally aspirated engine.

In addition, according to Embodiment 2, by setting the mode of the second electromagnetic valve 200a to the reverse suction mode in which a differential pressure before and behind the plunger 205 acts so as to open the plunger 205 when the vaporized gas is sucked into the engine 1 from the canister 7, it is possible to eliminate the need for the check valve, and omit the hose and the clip used for the connection of the check valve. In addition, there is no pressure loss in the check valve, and hence it becomes possible to further increase the flow rate of the vaporized gas.

Embodiment 3

Figure 9:
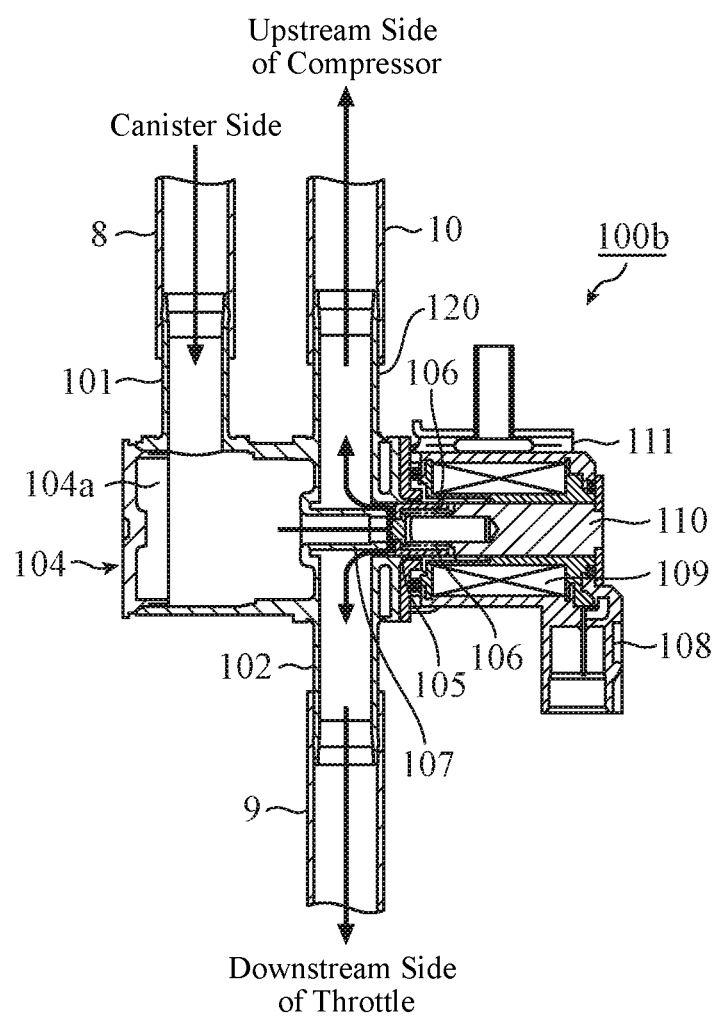
FIG. 9 is a cross-sectional view showing an example of the configuration of the electromagnetic valve used in the vaporized gas treatment system according to Embodiment 3 of the invention.
Figure 10:
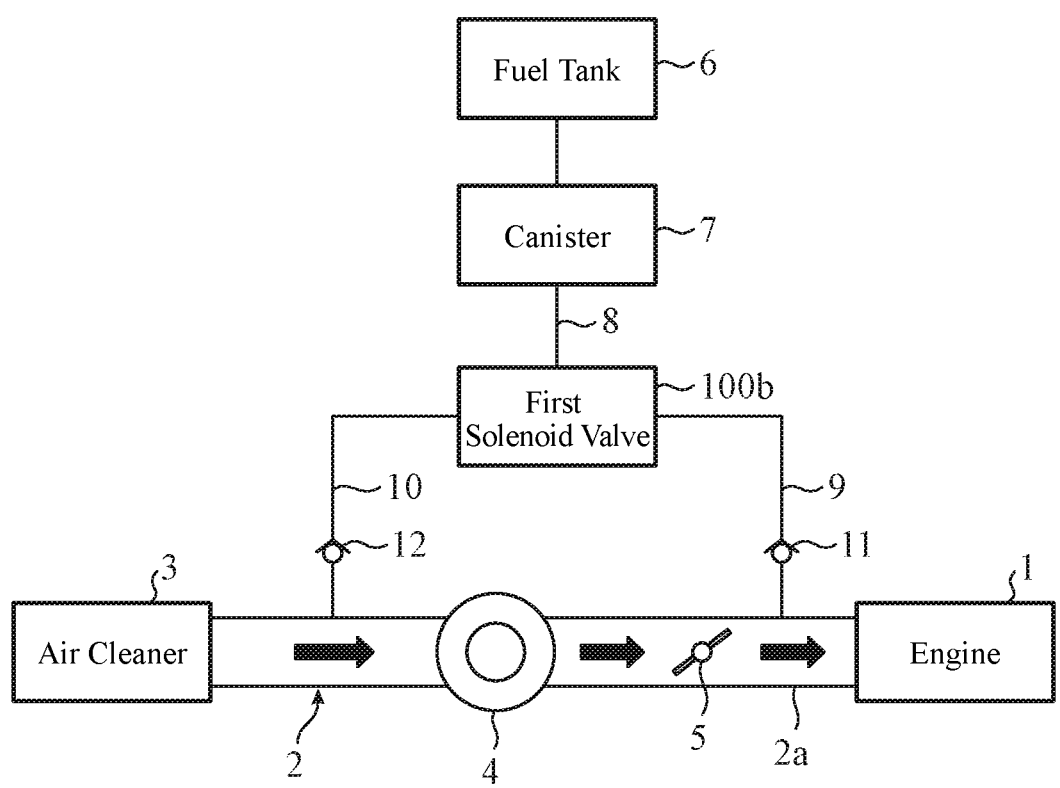
FIG. 10 is an overall configuration diagram of the vaporized gas treatment system according to Embodiment 3.

FIG. 9 is a cross-sectional view showing an example of the configuration of the electromagnetic valve used in the vaporized gas treatment system according to Embodiment 3 of the invention. FIG. 10 is an overall configuration diagram of the vaporized gas treatment system according to Embodiment 3. A first electromagnetic valve 100b shown in FIG. 9 is in the closed state. Note that portions in FIG. 9 and FIG. 10 that are identical or equivalent to those in FIGS. 1 to 8 are designated by the same reference numerals and the description thereof will be omitted.

In Embodiment 1 or 2 described above, the branch passage 104 or 204 branches on the suction side of the first electromagnetic valve 100 or the second electromagnetic valve 200a. In Embodiment 3, the branch passage 104 branches on the discharge side of the first electromagnetic valve 100b.

Specifically, as shown in FIG. 1, in the first electromagnetic valve 100 in Embodiment 1 described above, in the branch passage 104 that diverges from the suction port 101 into the discharge port 102 and the branch port 103 and interconnects these ports, the discharge port 102 and the branch port 103 are separated before the plunger 105 in the path from the suction port 101 to the discharge port 102, i.e., on the suction side.

In contrast, as shown in FIG. 9, in the first electromagnetic valve 100b according to Embodiment 3, in the branch passage 104 that diverges from the suction port 101 into the (first) discharge port 102 and a (second) discharge port 120, the discharge port 102 and the discharge port 120 are separated behind the plunger 105 in the path from the suction port 101 to the discharge ports 102 and 120, i.e., on the discharge side.

The suction port 101 of the first electromagnetic valve 100b is connected to the purge pipe 8, and communicates with the canister V. The discharge port 102 is connected to the first purge pipe 9, and communicates with the intake manifold 2a on the downstream side of the throttle. The discharge port 120 is connected to the second purge pipe 10, and communicates with the upstream side of the compressor 4. In the case where it is assumed that the suction port 101 of the branch passage 104 is the suction side and the side of the discharge ports 102 and 120 is the discharge side, the branch passage 104 is branched on the discharge side of the plunger 105 serving as the valve body. Communication between the suction port 101 and the discharge ports 102 and 120 is blocked when the plunger 105 abuts on the valve seat 107, and the suction port 101 and the discharge ports 102 and 120 communicate with each other when the plunger 105 is separated from the valve seat 107.

During non-turbocharging, in a state in which the first electromagnetic valve 100b is open, the vaporized gas stored in the canister 7 is sucked into the intake pipe 2 with the negative pressure of the intake manifold 2a via the purge pipe 8, the suction port 101, the chamber 104a and the discharge port 102 of the first electromagnetic valve 100b, and the first purge pipe 9, is mixed with air, and is caused to flow into the engine 1 to be combusted.

On the other hand, during turbocharging, in the state in which the first electromagnetic valve 100b is open, the vaporized gas stored in the canister 7 is sucked into the intake pipe 2 with the negative pressure of the upstream side of the compressor 4 via the purge pipe 8, the suction port 101, the chamber 104a and the discharge port 120 of the first electromagnetic valve 100b, and the second purge pipe 10, is mixed with air, and caused to flow into the engine 1 through the compressor 4 and the throttle valve 5 to be combusted.

Note that, in FIG. 9, a connection mode is adopted in which the discharge port 102 communicates with the intake manifold 2a and the discharge port 120 communicates with the upstream side of the compressor 4 but, conversely, a connection mode may also be adopted in which the discharge port 102 communicates with the upstream side of the compressor 4, and the discharge port 120 communicates with the intake manifold 2a.

Note that, the discharge port 102 communicates with the discharge port 120 irrespective of the open state or closed state of the first electromagnetic valve 100b, and hence, when the intake manifold 2a has a positive pressure, the vaporized gas flows backward to the discharge port 120 via the first purge pipe 9 and the discharge port 102. In addition, when the upstream side of the compressor 4 has a positive pressure, the vaporized gas flows backward to the discharge port 102 via the second purge pipe 10 and the discharge port 120. To cope with this, the first check valve 11 and the second check valve 12 that prevent the backflow are disposed in the first purge pipe 9 and the second purge pipe 10.

As described above, according to Embodiment 3, the first electromagnetic valve 100b includes the suction port 101 that communicates with the purge pipe 8 and sucks the vaporized gas from the canister 7, the discharge port 102 that communicates with the first purge pipe 9 and discharges the vaporized gas to the downstream side of the throttle, the discharge port 120 that communicates with the second purge pipe 10 and causes the vaporized gas to branch off to the upstream side of the compressor, the branch passage 104 that diverges from the suction port 101 into the discharge port 102 and the discharge port 120 and interconnects these ports, the plunger 105 that opens or closes the branch passage 104, and the chamber 104a which is a portion of the branch passage 104 and is larger than the inner diameters of the suction port 101 and the discharge ports 102 and 120. Accordingly, it is possible to eliminate the need for the branch pipe or the like that has been needed conventionally, improve the assembly workability, reduce the pressure loss of the vaporized gas, and increase the flow rate. In addition, it is possible to eliminate the need for the second electromagnetic valve 200 and the first electromagnetic valve 100a in Embodiments 1 and 2 described above, and further improve the assembly workability.

It is possible to freely combine the embodiments, modify any components of the embodiments, or omit any components of the embodiments within the scope of the invention.

INDUSTRIAL APPLICABILITY

The electromagnetic valve according to the invention is configured to reduce the pressure loss in the branch passage, and hence the electromagnetic valve is suitably used in the vaporized gas treatment system of the turbocharged engine, for example.

REFERENCE SIGNS LIST 1, 1a engine
2 intake pipe
2a intake manifold
3 air cleaner
4 compressor
5 throttle valve
6 fuel tank
7 canister
8 purge pipe
9, 9a, 9b first purge pipe
10, 10a, 10b second purge pipe
11 first check valve
12 second check valve
100, 100a, 100b, 100-1 first electromagnetic valve
101, 201 suction port
102, 120, 202 discharge port
103, 203 branch port
104, 204 branch passage
104a, 204a chamber
105, 205 plunger
106, 206 spring
107, 207 valve seat
108, 208 connector terminal
109, 209 coil
110, 210 core
111, 211 yoke
112, 212 plate
200, 200a second electromagnetic valve

The invention claimed is:

1. An electromagnetic valve for use in a vaporized gas treatment system which includes a canister for storing vaporized gas, a first purge pipe, a second purge pipe and a third purge pipe connected to the canister, the first purge pipe interconnecting the third purge pipe and a downstream side of a throttle of an intake pipe, the second purge pipe interconnecting the third purge pipe and an upstream side of a compressor of the intake pipe, and an engine to suck the vaporized gas stored in the canister into the intake pipe from the third purge pipe via the first purge pipe or the second purge pipe for combustion, the electromagnetic valve comprising:
three ports to communicate with the third purge pipe, the first purge pipe, and the second purge pipe;
a branch passage that diverges into and communicates with the three ports;
a valve body to open or close the branch passage; and
the branch passage including a portion being a chamber that is larger than each inner diameter of the three ports,
wherein the valve body opens or closes a passage from the canister to the downstream side of the throttle in the branch passage, and another electromagnetic valve is to be disposed in a passage from the canister to the upstream side of the compressor.

2. An electromagnetic valve for use in a vaporized gas treatment system which includes a canister for storing vaporized gas, a first purge pipe, a second purge pipe and a third purge pipe connected to the canister, the first purge pipe interconnecting the third purge pipe and a downstream side of a throttle of an intake pipe, the second purge pipe interconnecting the third purge pipe and an upstream side of a compressor of the intake pipe, and an engine to suck the vaporized gas stored in the canister into the intake pipe from the third purge pipe via the first purge pipe or the second purge pipe for combustion, the electromagnetic valve comprising:
three ports to communicate with the third purge pipe, the first purge pipe, and the second purge pipe;
a branch passage that diverges into and communicates with the three ports;
a valve body to open or close the branch passage; and
the branch passage including a portion being a chamber that is larger than each inner diameter of the three ports,
wherein the valve body opens or closes a passage from the canister to the upstream side of the compressor in the branch passage, and another electromagnetic valve is to be disposed in a passage from the canister to the downstream side of the throttle.

3. The electromagnetic valve according to claim 1, wherein the electromagnetic valve is in a reverse suction mode in which a differential pressure before and behind the valve body acts so as to open the valve body when the vaporized gas is sucked into the engine from the canister.

4. The electromagnetic valve according to claim 2, wherein the electromagnetic valve is in a reverse suction mode in which a differential pressure before and behind the valve body acts so as to open the valve body when the vaporized gas is sucked into the engine from the canister.

5. The electromagnetic valve according to claim 1, wherein the branch passage branches on a suction side of the valve body.

6. The electromagnetic valve according to claim 2, wherein the branch passage branches on a suction side of the valve body.

7. An electromagnetic valve for use in a vaporized gas treatment system which includes a canister for storing vaporized gas, a first purge pipe, a second purge pipe and a third purge pipe connected to the canister, the first purge pipe interconnecting the third purge pipe and a downstream side of a throttle of an intake pipe, the second purge pipe interconnecting the third purge pipe and an upstream side of a compressor of the intake pipe, and an engine to suck the vaporized gas stored in the canister into the intake pipe from the third purge pipe via the first purge pipe or the second purge pipe for combustion, the electromagnetic valve comprising:
   three ports to communicate with the third purge pipe, the first purge pipe, and the second purge pipe;
   a branch passage that diverges into and communicates with the three ports;
   a valve body to open or close the branch passage; and
   the branch passage including a portion being a chamber that is larger than each inner diameter of the three ports,
   wherein the branch passage branches on a discharge side of the valve body.

8. A vaporized gas treatment system comprising:
   a canister for storing vaporized gas;
   a first and a second purge pipe;
   a third purge pipe connected to the canister;
   the first purge pipe interconnecting the third purge pipe and a downstream side of a throttle of an intake pipe;
   the second purge pipe interconnecting the third purge pipe and an upstream side of a compressor of the intake pipe;
   an engine to suck the vaporized gas stored in the canister into the intake pipe from the third purge pipe via the first purge pipe or the second purge pipe for combustion;
   a first electromagnetic valve to control a flow rate of the vaporized gas that flows in the first purge pipe; and
   a second electromagnetic valve to control a flow rate of the vaporized gas that flows in the second purge pipe,
   wherein the first electromagnetic valve includes,
      a suction port that communicates with the third purge pipe and sucks the vaporized gas from the canister,
      a discharge port that communicates with the first purge pipe and discharges the vaporized gas to the downstream side of the throttle,
      a branch port that communicates with the second purge pipe to which the second electromagnetic valve is attached and causes the vaporized gas to branch off to the upstream side of the compressor,
      a branch passage that diverges into and communicates with the suction port, the discharge port, and the branch port,
      a valve body to open or close a passage that interconnects the suction port and the discharge port in the branch passage, and
      the branch passage including a portion being a chamber that is larger than each inner diameter of the suction port, the discharge port and the branch port.

9. A vaporized gas treatment system comprising:
   a canister for storing vaporized gas;
   a first and a second purge pipe;
   a third purge pipe connected to the canister;
   the first purge pipe interconnecting the third purge pipe and a downstream side of a throttle of an intake pipe;
   the second purge pipe interconnecting the third purge pipe and an upstream side of a compressor of the intake pipe;
   an engine to suck the vaporized gas stored in the canister into the intake pipe from the third purge pipe via the first purge pipe or the second purge pipe for combustion;
   a first electromagnetic valve to control a flow rate of the vaporized gas that flows in the first purge pipe; and
   a second electromagnetic valve to control a flow rate of the vaporized gas that flows in the second purge pipe,
   wherein the second electromagnetic valve includes,
      a suction port that communicates with the third purge pipe and sucks the vaporized gas from the canister,
      a discharge port that communicates with the second purge pipe and discharges the vaporized gas to the upstream side of the compressor,
      a branch port that communicates with the first purge pipe to which the first electromagnetic valve is attached and causes the vaporized gas to branch off to the downstream side of the throttle,
      a branch passage that diverges into and communicates with the suction port, the discharge port, and the branch port,
      a valve body to open or close a passage that interconnects the suction port and the discharge port in the branch passage, and
      the branch passage including a portion being a chamber that is larger than each inner diameter of the suction port, the discharge port and the branch port.

* * * * *